US012768961B2

(12) United States Patent
Frederiksen et al.

(10) Patent No.: US 12,768,961 B2
(45) Date of Patent: Oct. 20, 2026

(54) METHOD AND DEVICE FOR ACTIVATING A SPAD-BASED LIDAR SENSOR AND SURROUNDINGS DETECTION SYSTEM

(71) Applicant: Robert Bosch GmbH, Stuttgart (DE)

(72) Inventors: Annette Frederiksen, Renningen (DE); Mustafa Kamil, Ludwigsburg (DE)

(73) Assignee: Robert Bosch GmbH, Stuttgart (DE)

( * ) Notice: Subject to any disclaimer, the term of this patent is extended or adjusted under 35 U.S.C. 154(b) by 788 days.

(21) Appl. No.: 18/298,454

(22) Filed: Apr. 11, 2023

(65) Prior Publication Data

US 2023/0333225 A1 Oct. 19, 2023

(30) Foreign Application Priority Data

Apr. 14, 2022 (DE) ..................... 10 2022 203 792.8

(51) Int. Cl.
*G01S 7/487* (2006.01)
*G01S 7/484* (2006.01)
(Continued)

(52) U.S. Cl.
CPC ............ *G01S 7/4876* (2013.01); *G01S 7/484* (2013.01); *G01S 7/4865* (2013.01); *G01S 17/894* (2020.01)

(58) Field of Classification Search
CPC ........ G01S 7/483; G01S 7/484; G01S 7/4865; G01S 7/487; G01S 7/4876; G01S 17/02; G01S 17/10; G01S 17/42; G01S 17/894
(Continued)

(56) References Cited

U.S. PATENT DOCUMENTS

| | | | | |
|---|---|---|---|---|
| 2018/0259645 A1* | 9/2018 | Shu | ......................... | G01S 17/10 |
| 2020/0209355 A1* | 7/2020 | Pacala | ..................... | G01S 7/484 |

(Continued)

FOREIGN PATENT DOCUMENTS

| | | | | |
|---|---|---|---|---|
| CN | 111538020 A | * 8/2020 | ........... | G01S 7/4865 |
| CN | 118891539 A | * 11/2024 | ............ | G01S 7/486 |

(Continued)

OTHER PUBLICATIONS

Beer, et al., Background Light Rejection in SPAD-Based LiDAR Sensors by Adaptive Photon Coincidence Detection. Sensors (Basel). Dec. 8, 2018;18(12):4338. doi: 10.3390/s18124338. PMID: 30544791; PMCID: PMC6308528 https://pmc.ncbi.nlm.nih.gov/articles/PMC6308528/ (Year: 2018).*

(Continued)

*Primary Examiner* — Atul Trivedi
(74) *Attorney, Agent, or Firm* — Norton Rose Fulbright US LLP

(57) ABSTRACT

A method and to a device for activating a SPAD-based LIDAR sensor and a surroundings detection system. The method includes: emitting a predefined transmission pulse pattern into surroundings of the LIDAR sensor, the transmission pulse pattern being made up of a plurality of consecutive light pulses; detecting photons arriving in the LIDAR sensor within a predefined detection time period after the emission of a respective light pulse; generating histograms which represent a frequency of detected photons with respect to respective reception points in time, each histogram referring to a respective detection time period, and to a respective macropixel; ascertaining a histogram evaluation window, based on which those histograms corresponding to the transmission pulse pattern are selected from a chronological sequence of histograms which, during an allocation to a total histogram, meet predefined criteria (Continued)

for the total histogram; and providing the total histogram for generating a 3D point cloud.

10 Claims, 3 Drawing Sheets

(51) Int. Cl.
*G01S 7/4865* (2020.01)
*G01S 17/894* (2020.01)

(58) Field of Classification Search
USPC ........................................................ 365/5.01
See application file for complete search history.

(56) References Cited

U.S. PATENT DOCUMENTS

| | | | | |
|---|---|---|---|---|
| 2020/0284883 | A1* | 9/2020 | Ferreira | G01S 7/4817 |
| 2020/0284913 | A1* | 9/2020 | Amelot | G01S 7/4808 |
| 2021/0208263 | A1* | 7/2021 | Sutavani | G01S 17/42 |
| 2021/0333371 | A1* | 10/2021 | Pacala | G01S 17/10 |
| 2021/0364603 | A1* | 11/2021 | Kim | G01S 7/4815 |
| 2022/0003849 | A1* | 1/2022 | Tayu | G01S 7/4808 |
| 2022/0018941 | A1* | 1/2022 | Druml | G01S 17/08 |
| 2022/0043118 | A1* | 2/2022 | Pacala | G01S 7/4865 |
| 2022/0043156 | A1* | 2/2022 | Pacala | G06F 13/1673 |
| 2022/0057203 | A1* | 2/2022 | Tayu | G01S 17/42 |
| 2022/0057519 | A1* | 2/2022 | Goldstein | G01S 17/88 |
| 2022/0082702 | A1* | 3/2022 | Burbank | G01S 17/931 |
| 2022/0099814 | A1* | 3/2022 | Finkelstein | G01S 17/894 |
| 2022/0146647 | A1* | 5/2022 | Sakazume | G04F 10/04 |
| 2022/0155458 | A1* | 5/2022 | Jeong | G01S 17/89 |
| 2023/0266450 | A1* | 8/2023 | Maayan | G01S 7/4815 356/5.01 |
| 2024/0094359 | A1* | 3/2024 | Massoud | G01S 17/18 |
| 2024/0125931 | A1* | 4/2024 | Sakaguchi | H10F 30/225 |
| 2024/0418838 | A1* | 12/2024 | Song | G01S 17/04 |
| 2025/0199129 | A1* | 6/2025 | Sekiguchi | H04N 25/705 |
| 2025/0208268 | A1* | 6/2025 | Kado | G01S 17/42 |
| 2025/0208272 | A1* | 6/2025 | Hamamatsu | G01C 3/06 |

FOREIGN PATENT DOCUMENTS

| | | | | | |
|---|---|---|---|---|---|
| CN | 118974595 | A | * | 11/2024 | H10F 55/00 |
| CN | 118974600 | A | * | 11/2024 | G01S 7/4865 |
| DE | 102018201220 | A1 | | 8/2019 | |
| DE | 102018203535 | A1 | | 9/2019 | |
| DE | 102018126522 | A1 | | 4/2020 | |
| DE | 102018129972 | A1 | | 5/2020 | |
| EP | 4006578 | A1 | * | 6/2022 | G01S 7/4814 |
| KR | 20240146378 | A | * | 10/2024 | G01S 17/931 |
| KR | 20240146382 | A | * | 10/2024 | G01S 7/4863 |
| WO | WO-2021072397 | A1 | * | 4/2021 | G06F 13/1689 |
| WO | WO-2021124762 | A1 | * | 6/2021 | G01S 17/10 |
| WO | WO-2023085466 | A1 | * | 5/2023 | G01S 7/497 |
| WO | WO-2023140175 | A1 | * | 7/2023 | G01S 7/4863 |
| WO | WO-2024096421 | A1 | * | 5/2024 | G01S 17/10 |
| WO | WO-2024185307 | A1 | * | 9/2024 | G01S 7/4865 |
| WO | WO-2024190189 | A1 | * | 9/2024 | G01C 3/06 |
| WO | WO-2024257565 | A1 | * | 12/2024 | H04N 25/773 |

OTHER PUBLICATIONS

Qian, et al., "Single Photon Detectors for Automotive LiDAR Applications: State-of-the-Art and Research Challenges," IEEE Journal of Selected Topics in Quantum Electronics, v. 30, #1: Single-Photon Technologies and Applications, pp. 1-20, Jan.-Feb. 2024 https://ieeexplore.ieee.org/document/10214649 (Year: 2024).*

* cited by examiner

METHOD AND DEVICE FOR ACTIVATING A SPAD-BASED LIDAR SENSOR AND SURROUNDINGS DETECTION SYSTEM

CROSS REFERENCE

The present application claims the benefit under 35 U.S.C. § 119 of German Patent Application No. DE 10 2022 203 792.8 filed on Apr. 14, 2022, which is expressly incorporated herein by reference in its entirety.

FIELD

The present invention relates to a method and to a device for activating a SPAD-based LIDAR sensor and to a surroundings detection system including such a LIDAR sensor.

BACKGROUND INFORMATION

Some LIDAR sensors in the related art include receiving units which are designed based on the so-called single-photon avalanche diode (SPAD) technology and, due to the use of this technology, have a particularly high sensitivity.

Since such SPAD-based receiving units already respond to a reception of individual photons, a so-called “concurrence detection” method is frequently used for avoiding erroneous detections, i.e., for avoiding detections which are not caused by portions of a light emitted by the LIDAR sensor which are reflected in the surroundings of the LIDAR sensor (e.g., triggered by background light), which, for example, based on a majority decision with respect to detections in individual pixels of respective macropixels of the receiving unit generates a respective run-time histogram.

Additionally, it is conventional in the related art to reduce or avoid cross-talk in the reception path of SPAD-based receiving units, which, for example, may result in the concealment of objects in the surroundings of LIDAR sensors, with the aid of various measures.

German Patent Application No. DE 10 2018 201 220 A1 describes a distance detection system with the aid of which electromagnetic measuring pulses are emittable and receivable, an embodiment and/or a sequence and/or a number of the emitted measuring pulses being varied, in particular during a total measuring period. As a result of the variation of the measuring pulses, it is achieved that a perturbance by light signals or measuring pulses of other LIDAR systems is reduced or suppressed.

German Patent Application No. DE 10 2018 126 522 A1 describes a method for TOF distance measurement, which encompasses a transmission of a pulse sequence of laser pulses. The pulse sequence is modulated in agreement with a modulation reference code. The method furthermore includes a measuring of a sequence of photon events over a measuring period, using a detector, a binning of at least several of the photon events of the sequence of photon events in a sequence, and a downstream correlation of the sequence with correlation codes to ascertain a distance of objects based on the correlation.

SUMMARY

According to a first aspect of the present invention, a method for activating a SPAD-based LIDAR sensor is provided. According to an example embodiment of the present invention, the LIDAR sensor is preferably designed as a macroscanner, which is configured to scan surroundings of the LIDAR sensor with the aid of a scan line, which is successively moved, during a scanning process, over a field of vision of the LIDAR sensor with the aid of a deflection unit of the LIDAR sensor. Additionally, the LIDAR sensor is preferably designed as a so-called time-of-flight (TOF) sensor, which is configured, based on a determination of light propagation times, to ascertain distances of objects in the surroundings of the LIDAR sensor which correspond to the light propagation times.

The LIDAR sensor is, for example, a LIDAR sensor of a vehicle, which, amongst others, may be a passenger car, a truck, a bus, a rail vehicle, a two-wheeler or a vehicle differing therefrom.

The above description does not explicitly preclude the method according to the present invention from also being usable with configurations and/or fields of applications of the LIDAR sensor differing therefrom.

In a first step of the method according to an example embodiment of the present invention, a predefined transmission pulse pattern (also referred to as a “burst” due to the included rapid succession of individual pulses) is emitted into surroundings of the LIDAR sensor, the transmission pulse pattern being made up of a plurality of consecutive light pulses (i.e., at least two light pulses and, for example, 30 to 100 light pulses or more or fewer), which are generated with the aid of a transmitting unit of the LIDAR sensor. It shall be pointed out that the term “light” or “light pulse” shall also be understood to mean electromagnetic waves, whose wavelengths may be outside a wavelength range visible to the human eye. The light emitted by the LIDAR sensor in the form of the light pulses is preferably in the infrared wavelength range, and further preferably in the near-infrared wavelength range, without thereby providing a limitation to these wavelength ranges.

In a second step of the method according to an example embodiment of the present invention, photons arriving in the LIDAR sensor are detected with the aid of a SPAD-based receiving unit of the LIDAR sensor within a predefined detection time period after the emission of a respective light pulse. The detection time period may be a detection time period which is uniformly established after each emission of a respective light pulse. As an alternative, it is possible that a specifically predefined detection time period is used for each light pulse or for a respective predefined subset of light pulses. The latter is advantageously usable in particular when the light pulses of a transmission pulse pattern at least partially have different pulse widths.

In a third step of the method according to an example embodiment of the present invention, histograms are generated, which represent a frequency of detected photons with respect to respective reception points in time, each histogram being based on a respective detection time period, i.e., on a time period after each transmission pulse and on a respective macropixel of the receiving unit of the LIDAR sensor. Based on those photons which were emitted by the transmitting unit of the LIDAR sensor, reflected or scattered in surroundings of the LIDAR sensor and detected with the aid of the receiving unit, respective classes (“bins”) of the histograms advantageously represent respective run times of the detected photons, which is why the histograms are accordingly also referred to as run-time histograms.

To avoid the above-described erroneous detections, which are caused, for example, due to photons generated by perturbance sources in the surroundings of the LIDAR sensor, a method for “concurrence detection” from the related art is advantageously employed. This method provides that a receiving surface of the SPAD-based receiving unit is divided into a plurality of macropixels, each macropixel being made up of at least two individual pixels, and preferably of a higher number of individual pixels. For example, each macropixel includes 3×3 individual pixels (i.e., a rectangle having a width of 3 pixels in the horizontal direction and 3 pixels in the vertical direction) or a number or geometric division differing therefrom. Based on predefined criteria, a total detection result is subsequently ascertained for each macropixel from respective contemporaneous detections of individual pixels in each macropixel. This takes place, for example, based on a majority decision to establish whether, at a particular reception point in time, predominantly photons which were previously emitted by the LIDAR sensor were detected within the respective macropixel, or whether predominantly photons which were not emitted by the LIDAR sensor, and which are not suitable and undesirable for a reliable surroundings detection, were detected within the macropixel.

In other words, a filtering of the detected photons takes place based on the method of "concurrence detection," by which undesirable detections which were predominantly not generated by the scanning of the LIDAR sensor are largely filtered out. Additionally, it shall be pointed out that a histogram for each macropixel does not necessarily have to be created for each emitted light pulse of the transmission pulse sequence, but that this is advantageous for a particularly flexible downstream processing.

In a fourth step of an example embodiment of the present invention, a histogram evaluation window is ascertained, based on which those histograms corresponding to the transmission pulse pattern (which were ascertained at every light pulse for each macropixel) are selected from a chronological sequence of the histograms (hereafter referred to as individual histograms) which during an allocation to a total histogram (i.e., a total histogram for each macropixel) meet predefined criteria for the total histogram.

In other words, during the detection of the individual light pulses of the transmission pulse pattern, advantageously an individual histogram is generated per transmission pulse for each macropixel so that, from this plurality of histograms, those may be selected for each macropixel which, in the course of the allocation to a total histogram, provide the best contributions for achieving the predefined criteria for the total histogram. It is possible in the process that all individual histograms, which are created during the reception of the transmission pulse sequence for each macropixel, are kept available in a memory unit to subsequently select the best-suited individual histograms.

Alternatively, it is also possible, based on additional information (e.g., information from an evaluation of a preceding transmission pulse pattern), to store only those histograms which are relevant for the calculation of the particular total histogram. In a case in which the transmission pulse pattern has, for example, 50 consecutive light pulses, it is possible, for example, to select, with the aid of the histogram evaluation window, those ascertained histograms which correspond to the light pulses 20 through 40 since these, in this example, make the best contribution to the adherence to the predefined criteria for the total histogram. The allocation of the individual histograms selected with the aid of the histogram evaluation window into a total histogram per macropixel and per transmission pulse pattern takes place, for example, by an addition of the values of the respective corresponding classes of the individual histograms (i.e., those classes which represent the same reception points in time or run times). Moreover, allocation regulations differing therefrom may be employed.

In this connection, it shall be pointed out that it is possible to ascertain and employ an individual histogram evaluation window for each macropixel. Additionally, it is not necessarily required that a portion of the ascertained individual histograms is excluded from the calculation of the total histogram as a result of the use of the histogram evaluation window. Instead, it is also possible, depending on the situation, that the histogram evaluation window extends over all individual histograms which were generated with respect to a transmission pulse pattern, so that all individual histograms are incorporated into the total histogram.

According to an example embodiment of the present invention, it is advantageous to incorporate as high as possible a number of individual histograms into the calculation of the total histogram to increase a reliability of the surroundings detection (amongst others, so that in this way a better signal-to-noise ratio may be achieved).

In a fifth step of the method according to an example embodiment of the present invention, the total histogram, which was calculated as described above from the individual histograms selected with the aid of the histogram evaluation window, is provided for the generation of a 3D point cloud representing the surroundings of the LIDAR sensor.

Moreover, it applies that the transmission pulse pattern has a variation of at least one parameter defining the light pulses, and that the transmission pulse pattern is essentially completely emitted within one and the same solid angle of the surroundings of the LIDAR sensor which is to be scanned by the LIDAR sensor. In other words, a multiple scan of one and the same solid angle with the aid of the light pulses of an individual transmission pulse pattern is to be achieved. This is the prerequisite both for using of the above-described "concurrence detection" and for carrying out the method according to the present invention. Since a deflection unit of a macro scanner, in general, is based on a rotating mirror, which carries out a constant rotational movement, the duration of the pulse sequence is accordingly to be selected in such a way that, despite the constant rotational movement of the deflection unit, essentially always the same solid angle is scanned, so that the measurements of the received pulses are accordingly comparable.

The above-described method according to the present invention offers the particular advantage that a scanning of surroundings of the LIDAR sensor takes place particularly reliably and flexibly since it is ensured by the method that, for example, areas which, due to cross-talk as a result of highly reflective objects in the surroundings (e.g., retroreflective road signs), are able to cover relevant areas during the surroundings detection, are detected with the aid of a suitable selection of the histogram evaluation window in such a way that cross-talk is avoided or at least considerably reduced. The same applies, for example, also to an enhanced detection of understeered areas.

In this way, dynamically balanced point clouds, which are particularly advantageously usable, may be generated from the total histograms ascertained according to the present invention, which are subsequently usable for a particularly reliable object recognition. In particular, when taking the point clouds generated according to the present invention into consideration during the control of an autonomously and/or semi-autonomously driving vehicle, a traffic safety for the vehicle and/or its surroundings may be increased.

Preferred refinements of the present invention are disclosed herein.

In one advantageous embodiment of the present invention, the variation of the at least one parameter defining the light pulses encompasses a variation of intensities of the light pulses of the transmission pulse pattern and, in particular, a monotonically increasing or monotonically decreasing intensity of consecutive light pulses of the transmission pulse pattern. A monotonically increasing or a monotonically decreasing intensity of the light pulses of the transmission pulse pattern makes it possible, for example, that, if cross-talk is present on the reception side, those light pulses are selected by the histogram evaluation window whose intensity does not result, or results only to a minor degree, in cross-talk due to, for example, highly reflective objects in the surroundings of the LIDAR sensor so that, during the allocation of the selected light pulses, a total histogram may be generated which has no or essentially no cross-talk. As an alternative or in addition, the variation of the at least one parameter encompasses a chaotic and/or a stochastic variation of the intensity of the light pulses and/or a variation of distances and/or widths of the light pulses and/or a variation of repetitions and/or pulse sequence to pause ratios within the transmission pulse pattern.

Particularly advantageously, according to an example embodiment of the present invention, the predefined criteria for the total histogram encompass an undershooting of a predefined oversteering threshold for cross-talk avoidance and/or an exceedance of a predefined understeering threshold and/or an adherence to a predefined signal-to-noise ratio and/or an adherence to a predefined dynamic range. Accordingly, only those light pulses of the transmission pulse sequence are selected with the aid of the histogram selection window which make it possible to adhere to one or multiple of the above criteria for the total histogram. It shall be pointed out that, alternatively or additionally, further criteria, which are not mentioned here, are usable in connection with the method according to the present invention.

In one further advantageous embodiment of the present invention, a width and/or a starting point of the histogram evaluation window is/are adapted for the adherence to the predefined criteria for the total histogram. This enables a particularly flexible selection of respective suitable individual histograms, which are used for calculating the respective total histograms. In the case of an exemplary use of a monotonically increasing transmission pulse pattern with respect to the intensity of the light pulses, it is possible in this way to discard those histograms which were temporally generated first and which have an understeering with the aid of the histogram evaluation window and, at the same time, select the histogram evaluation window so wide that a dynamic range which is as balanced as possible is achieved, which additionally has no oversteerings.

According to an example embodiment of the present invention, to further increase a flexibility during the creation of the total histogram, it is additionally possible that the histogram evaluation window, prior to its use, is weighted with the aid of a predefined weighting function so that the histograms selected with the aid of the histogram evaluation window may be incorporated into the total histogram with differing weightings.

The histogram evaluation window is preferably established as a function of a solid angle of the surroundings which is to be scanned by the LIDAR sensor, so that, for example, solid angles which due to present highly reflective objects may result in oversteering are detected with differently designed histogram evaluation windows than solid angles without such highly reflective objects. As an alternative or in addition, the histogram evaluation window is established as a function of respective macropixels (e.g., to combine, according to HDR photography, individual areas of the field of vision of the LIDAR sensor with respective individually adapted dynamics) of the receiving unit and/or one or multiple preceding histogram evaluation window(s) (e.g., from a preceding solid angle/scan frame or from a preceding scan pass). As an alternative or in addition, the histogram evaluation window is established as a function of a maximum permissible latency period during the surroundings detection (e.g., to enable, during a first scan pass, a preferably rapid recognition of cross-talk at a shorter range to detect the surroundings in a subsequent scan pass at a long range, using the avoidance of cross-talk according to the present invention). Further alternatively or additionally, the histogram evaluation window is established as a function of a desired range of the LIDAR sensor and/or a quality of a point cloud, which was generated based on a preceding total histogram.

According to an example embodiment of the present invention, further advantageously, the transmission pulse pattern is selected as a function of a respective solid angle to be scanned and/or as a function of surroundings conditions (e.g., conditions impairing visibility such as rain, snow, smoke, etc.) as a function of a required eye safety (which may also be different depending on the situation, for example depending on the surroundings) from a plurality of predefined transmission pulse patterns.

In one further advantageous embodiment of the present invention, a starting position and/or a width and/or a weighting of the histogram evaluation window is/are established as a function of the transmission pulse pattern used.

According to a second aspect of the present invention, a device for activating a SPAD-based LIDAR sensor is provided. According to an example embodiment of the present invention, the device includes a transmitting unit (which, e.g., is designed based on one or multiple infrared diode(s)), a SPAD-based receiving unit, and an evaluation unit, the evaluation unit, for example, being configured as an ASIC, a FPGA, a processor, a digital signal processor, a microcontroller, or the like. The transmitting unit is configured to generate a predefined transmission pulse pattern and to emit it into surroundings of the LIDAR sensor, the transmission pulse pattern being made up of a plurality of consecutive light pulses. The receiving unit is configured to detect photons arriving in the LIDAR sensor within a predefined detection time period after the emission of a respective light pulse. The evaluation unit is finally configured to generate histograms which represent a frequency of detected photons with respect to respective reception points in time, each histogram being based on a respective detection time period, and on a respective macropixel of the receiving unit of the LIDAR sensor. The evaluation unit is furthermore configured to ascertain a histogram evaluation window, based on which those histograms corresponding to the transmission pulse pattern are selected from a chronological sequence of histograms which, during an allocation to a total histogram, meet predefined criteria for the total histogram. Moreover, the evaluation unit is configured to provide the total histogram for the generation of a 3D point cloud representing the surroundings of the LIDAR sensor. In the process, it applies that the transmission pulse pattern has a variation of at least one parameter defining the light pulses, and is essentially completely emitted within one and the same solid angle of the surroundings of the LIDAR sensor which is to be scanned by the LIDAR sensor. The features, feature combinations as well as the advantages resulting therefrom correspond to those provided in connection with the former aspect of the present invention in such an obvious way that reference is made to the above comments to avoid repetition.

According to a third aspect of the present invention, a surroundings detection system is provided, which includes a device disclosed herein and/or according to the above description, and a processing unit, it being possible for the processing unit to be an integral part of the evaluation unit according to the present invention or an independent component. According to an example embodiment of the present invention, the processing unit is configured to receive information representing total histograms from the device, and to ascertain a 3D point cloud representing surroundings based on the total histograms. The features, feature combinations as well as the advantages resulting therefrom correspond to those provided in connection with the first and second aspects of the present invention in such an obvious way that reference is made to the above comments to avoid repetition.

BRIEF DESCRIPTION OF THE DRAWINGS

Exemplary embodiments of the present invention are described hereafter in greater detail with reference to the figures.

DETAILED DESCRIPTION OF EXAMPLE EMBODIMENTS

Figure 1:
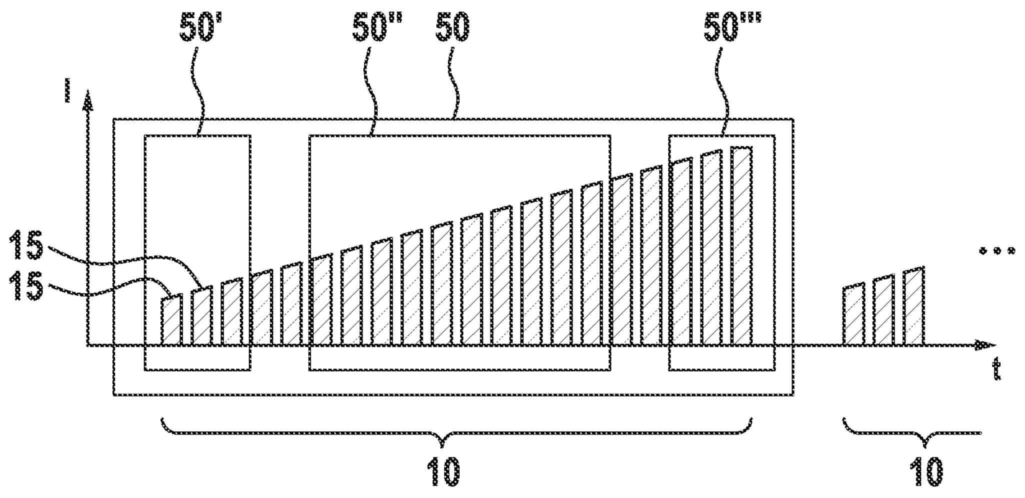
FIG. 1 shows a first specific embodiment of a transmission pulse pattern according to the present invention in conjunction with different histogram evaluation windows.

FIG. 1 shows a first specific embodiment of a transmission pulse pattern 10 according to the present invention in conjunction with different histogram evaluation windows 50, 50', 50'', 50'''.

Figure 6:
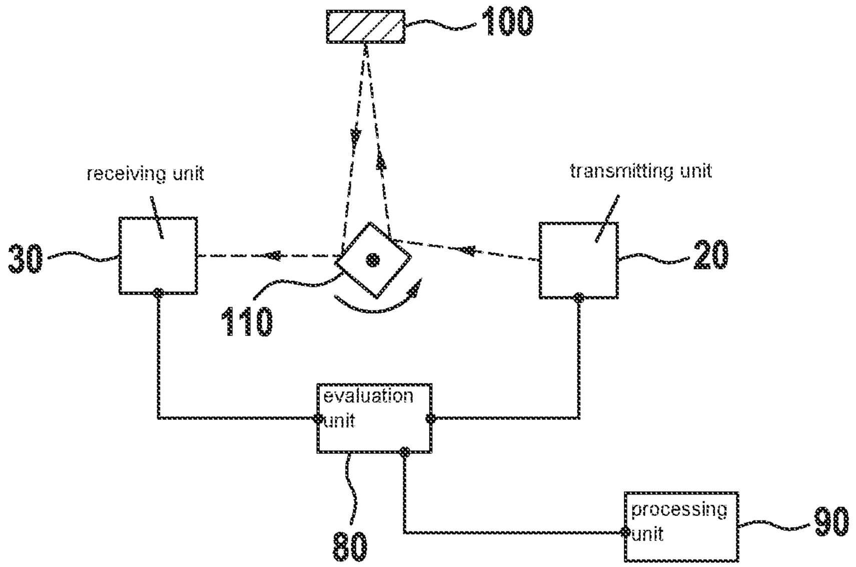
FIG. 6 shows a schematic view of one exemplary embodiment of a surroundings detection system according to the present invention.

Transmission pulse pattern 10, which is generated with the aid of a transmitting unit 20, shown in FIG. 6, of a LIDAR sensor according to the present invention, is formed by a plurality of individual light pulses 15 here (of which, by way of example, only the first two light pulses 15 are identified here), which each have a uniform width and a uniform distance with respect to one another, but have a light intensity I monotonically increasing over time t.

Taking predefined criteria for a generation of a total histogram into consideration, different histogram evaluation windows 50, 50', 50'', 50''' are applied here by way of example to histograms of received echoes of the emitted light pulses 15. The individual histograms selected by the respective histogram evaluation windows 50, 50', 50'', 50''' are subsequently added to the above-described total histogram. In this way, it is possible, depending on the situation, to ascertain and to use in each case the best-suited combination of individual histograms.

It shall be pointed out that both the starting position and the widths of the respective histogram evaluation windows may arbitrarily deviate from the specific characteristics here.

Figure 2:
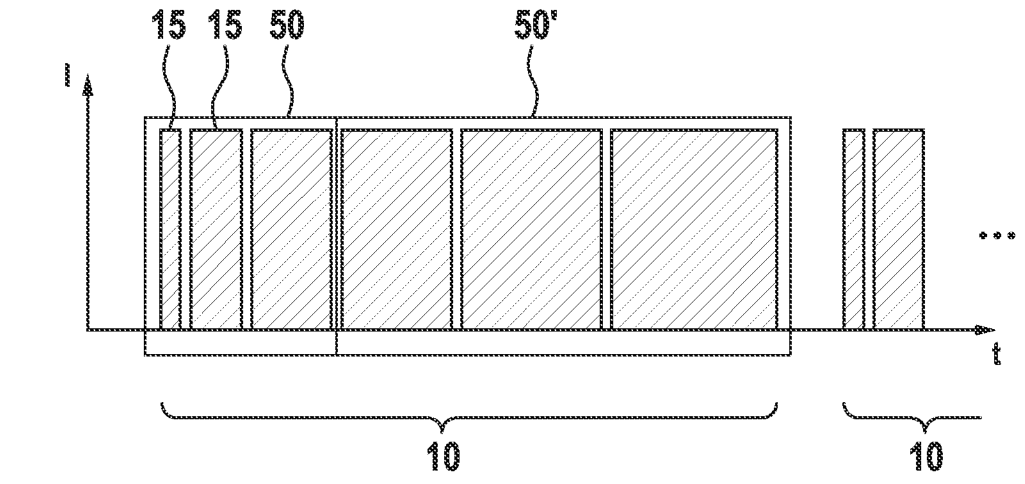
FIG. 2 shows a second specific embodiment of a transmission pulse pattern according to the present invention in conjunction with different histogram evaluation windows.

FIG. 2 shows a second specific embodiment of a transmission pulse pattern 10 according to the present invention in conjunction with different histogram evaluation windows 50, 50', here a width of light pulses 15 of transmission pulse pattern 10 that varies.

Figure 3:
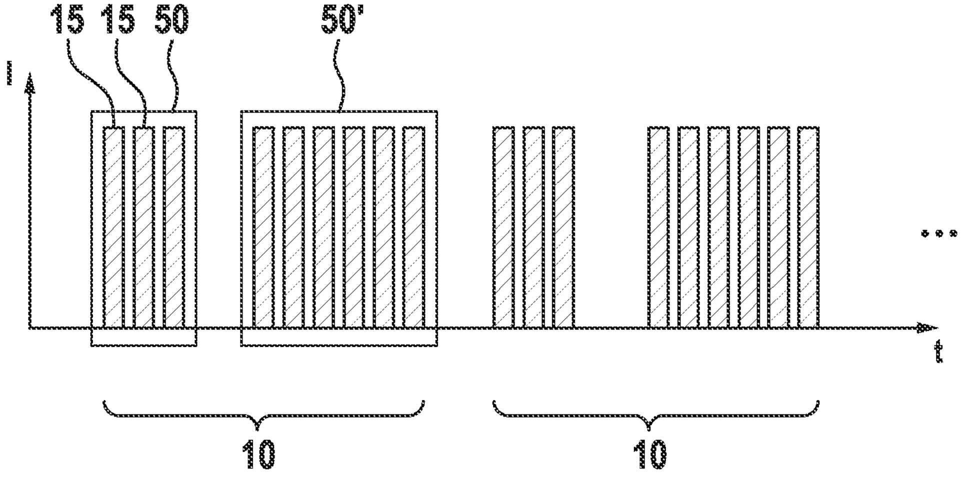
FIG. 3 shows a third specific embodiment of a transmission pulse pattern according to the present invention in conjunction with different histogram evaluation windows.

FIG. 3 shows a third specific embodiment of a transmission pulse pattern 10 according to the present invention in conjunction with different histogram evaluation windows 50, 50'. In this specific embodiment, different groupings of light pulses 15 are generated, light pulses 15 in each case having identical intensities and widths. By way of example, here in each case one histogram evaluation window 50 is used for the first grouping of light pulses 15, and one histogram evaluation window 50' is used for the second grouping of light pulses 15.

Figure 4:
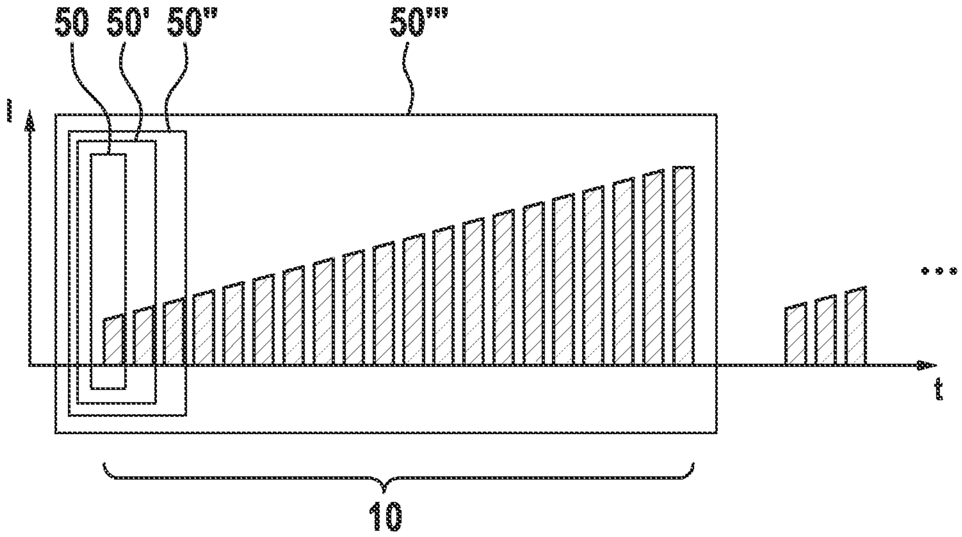
FIG. 4 shows a fourth specific embodiment of a transmission pulse pattern according to the present invention in conjunction with different histogram evaluation windows.

FIG. 4 shows a fourth specific embodiment of a monotonically increasing transmission pulse pattern 10 according to the present invention in conjunction with different histogram evaluation windows 50, 50', 50'', 50'''. Here, a starting position of the respective histogram evaluation windows 50, 50', 50'', 50''' is maintained, while the lengths of the histogram evaluation windows 50, 50', 50'', 50''' are varied to optimally evaluate a respective transmission pulse pattern 10 on the reception side.

Figure 5:
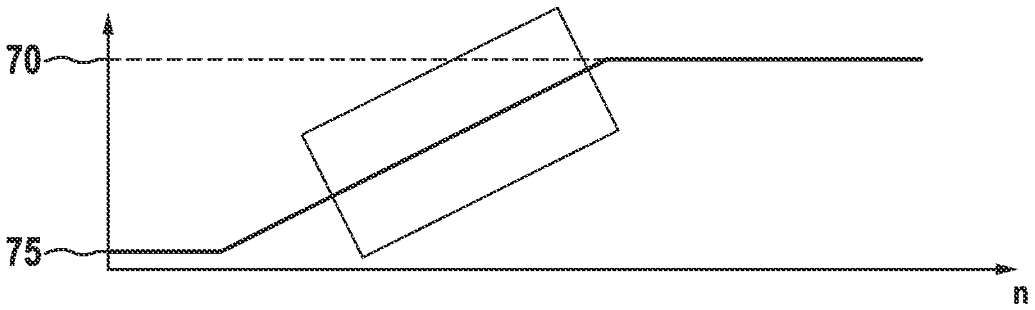
FIG. 5 shows an example of a predefined criterion to be adhered to by a histogram evaluation window, according to the present invention.

FIG. 5 shows an example of a predefined criterion to be adhered to by a histogram evaluation window 50, the criterion representing an adherence to a predefined dynamic range which is adhered to by ensuring that, as a result of the establishment of histogram evaluation window 50, none of the individual histograms to be combined falls short of an understeering threshold 75 and exceeds an oversteering threshold 75 [sic]. The rectangle shown in FIG. 5 represents those individual histograms which are incorporated into the allocation of the total histogram, while n represents an index of the respective chronologically sorted individual histograms.

FIG. 6 shows a schematic view of one exemplary embodiment of a surroundings detection system according to the present invention, the surroundings detection system here being a surroundings detection system of a vehicle, specifically of a passenger car.

The surroundings detection system includes a LIDAR sensor according to the present invention, which includes a transmitting unit 20, a SPAD-based receiving unit 30, and a rotatable deflection unit 110 which is configured to deflect a transmission pulse pattern 10 generated by transmitting unit 20 into surroundings of the LIDAR sensor and to deflect portions of transmission pulse pattern 10 which are scattered in the surroundings by an object 100 to SPAD-based receiving unit 30.

Transmitting unit 20 and receiving unit 30 are each connected, in terms of information technology, to an evaluation unit 80 according to the present invention, which is configured to control the emission of transmission pulse pattern 10 in transmitting unit 20 and to receive signals generated by receiving unit 30 and to process them according to the described method according to the present invention.

Evaluation unit 80 is furthermore configured to transfer a result of the processing operation, which is in each case a piece of information representing a total histogram, to a processing unit 90, which is connected, in terms of information technology, to evaluation unit 80. Processing unit 90 here is situated in a powerful central processor of the vehicle, which is configured to ascertain a 3D point cloud based on the information which is subsequently used for autonomously controlling the vehicle.

What is claimed is:

1. A method for activating a SPAD-based LIDAR sensor, comprising the following steps:

emitting a predefined transmission pulse pattern into surroundings of the LIDAR sensor, the transmission pulse pattern being made up of a plurality of consecutive light pulses which are generated using a transmitting unit of the LIDAR sensor;

detecting photons arriving in the LIDAR sensor using a SPAD-based receiving unit of the LIDAR sensor within a respective predefined detection time period after the emission of a respective light pulse of the consecutive light pulses;

generating histograms which represent a frequency of detected photons with respect to respective reception points in time, each histogram referring to the respective detection time period, and to a respective macropixel of the receiving unit of the LIDAR sensor;

ascertaining a histogram evaluation window, based on which those of the histograms corresponding to the transmission pulse pattern are selected from a chronological sequence of histograms which, during an allocation of the selected histograms to a total histogram, meet predefined criteria for the total histogram; and providing the total histogram for generating a 3D point cloud representing the surroundings of the LIDAR sensor;

wherein the transmission pulse pattern:

has a variation of at least one parameter defining the light pulses, and is essentially completely emitted within the same solid angle of the surroundings of the LIDAR sensor which is to be scanned by the LIDAR sensor.

2. The method as recited in claim 1, wherein the variation of the at least one parameter defining the light pulses includes a variation of:

intensities of the light pulses of the transmission pulse pattern including a monotonically increasing or decreasing intensity of consecutive light pulses and/or a chaotic or a stochastic variation of the intensity of the light pulses, and/or distances and/or widths of the light pulses, and/or repetitions and/or pulse sequence to pause ratios within the transmission pulse pattern.

3. The method as recited in claim 1, wherein the predefined criteria for the total histogram include:

an undershooting of a predefined oversteering threshold, and/or an exceedance of a predefined understeering threshold, and/or an adherence to a predefined signal-to-noise ratio, and/or an adherence to a predefined dynamic range.

4. The method as recited in claim 1, wherein a width and/or a starting point of the histogram evaluation window is adapted for adherence to the predefined criteria for the total histogram.

5. The method as recited in claim 1, wherein the histogram evaluation window, prior to its use, is weighted using a predefined weighting function.

6. The method as recited in claim 1, wherein the histogram evaluation window is established as a function of:

a solid angle of the surroundings which is to be scanned by the LIDAR sensor, and/or a respective macropixel of the receiving unit, and/or one or more preceding histogram evaluation windows, and/or a maximum permissible latency period, and/or a desired range of the LIDAR sensor, and/or a quality of a point cloud which was generated based on a preceding total histogram.

7. The method as recited in claim 1, wherein the transmission pulse pattern is selected from a plurality of predefined transmission pulse patterns as a function of a respective solid angle to be scanned, and/or surroundings conditions, and/or a required eye safety.

8. The method as recited in claim 7, wherein a starting position and/or a width and/or a weighting of the histogram evaluation window is established as a function of the transmission pulse pattern used.

9. A device configured to activate a SPAD-based LIDAR sensor, including:

a transmitting unit;

a SPAD-based receiving unit; and an evaluation unit;

wherein the transmitting unit is configured to generate a predefined transmission pulse pattern and to emit it into surroundings of the LIDAR sensor, the transmission pulse pattern being made up of a plurality of consecutive light pulses;

wherein the receiving unit is configured to detect photons arriving in the LIDAR sensor within a predefined detection time period after the emission of a respective light pulse of the consecutive light pulses;

wherein the evaluation unit is configured to:

generate histograms which represent a frequency of detected photons with respect to respective reception points in time, each histogram referring to the respective detection time period, and to a respective macropixel of the receiving unit of the LIDAR sensor;

ascertain a histogram evaluation window, based on which those of the histograms corresponding to the transmission pulse pattern are selected from a chronological sequence of histograms which, during an allocation of the selected histograms to a total histogram, meet predefined criteria for the total histogram; and provide the total histogram for generating a 3D point cloud representing the surroundings of the LIDAR sensor; and wherein the transmission pulse pattern:

has a variation of at least one parameter defining the light pulses, and is essentially completely emitted within the same solid angle of the surroundings of the LIDAR sensor which is to be scanned by the LIDAR sensor.

10. A surroundings detection system, comprising:

a device configured to activate a SPAD-based LIDAR sensor, including:

a transmitting unit;

a SPAD-based receiving unit; and an evaluation unit;

wherein the transmitting unit is configured to generate a predefined transmission pulse pattern and to emit it into surroundings of the LIDAR sensor, the transmission pulse pattern being made up of a plurality of consecutive light pulses;

wherein the receiving unit is configured to detect photons arriving in the LIDAR sensor within a predefined detection time period after the emission of a respective light pulse of the consecutive light pulses;

wherein the evaluation unit is configured to:

generate histograms which represent a frequency of detected photons with respect to respective reception points in time, each histogram referring to the respective detection time period, and to a respective macropixel of the receiving unit of the LIDAR sensor;

ascertain a histogram evaluation window, based on which those of the histograms corresponding to the transmission pulse pattern are selected from a chronological sequence of histograms which, during an allocation of the selected histograms to a total histogram, meet predefined criteria for the total histogram; and provide the total histogram for generating a 3D point cloud representing the surroundings of the LIDAR sensor; and wherein the transmission pulse pattern:

has a variation of at least one parameter defining the light pulses, and is essentially completely emitted within the same solid angle of the surroundings of the LIDAR sensor which is to be scanned by the LIDAR sensor; and a processing unit configured to:

receive information representing total histograms from the device, and ascertain a 3D point cloud representing surroundings based on the total histograms.

* * * * *